Dec. 25, 1928.  1,696,654
I. F. STEM ET AL
ROLLER CULTIVATOR
Filed Feb. 21, 1927  2 Sheets-Sheet 1
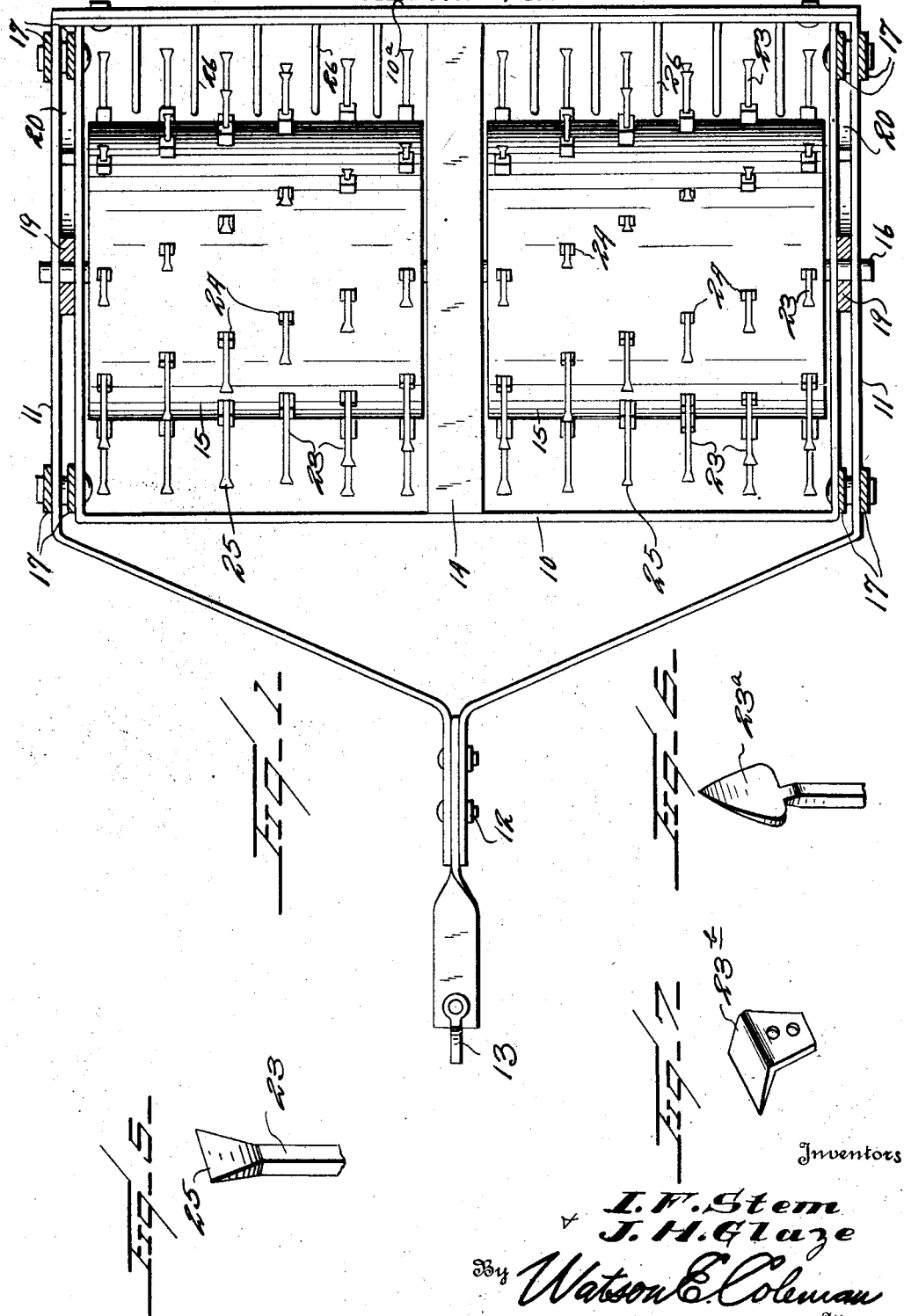
Inventors.
I. F. Stem
J. H. Glaze
By Watson E. Coleman
Attorney

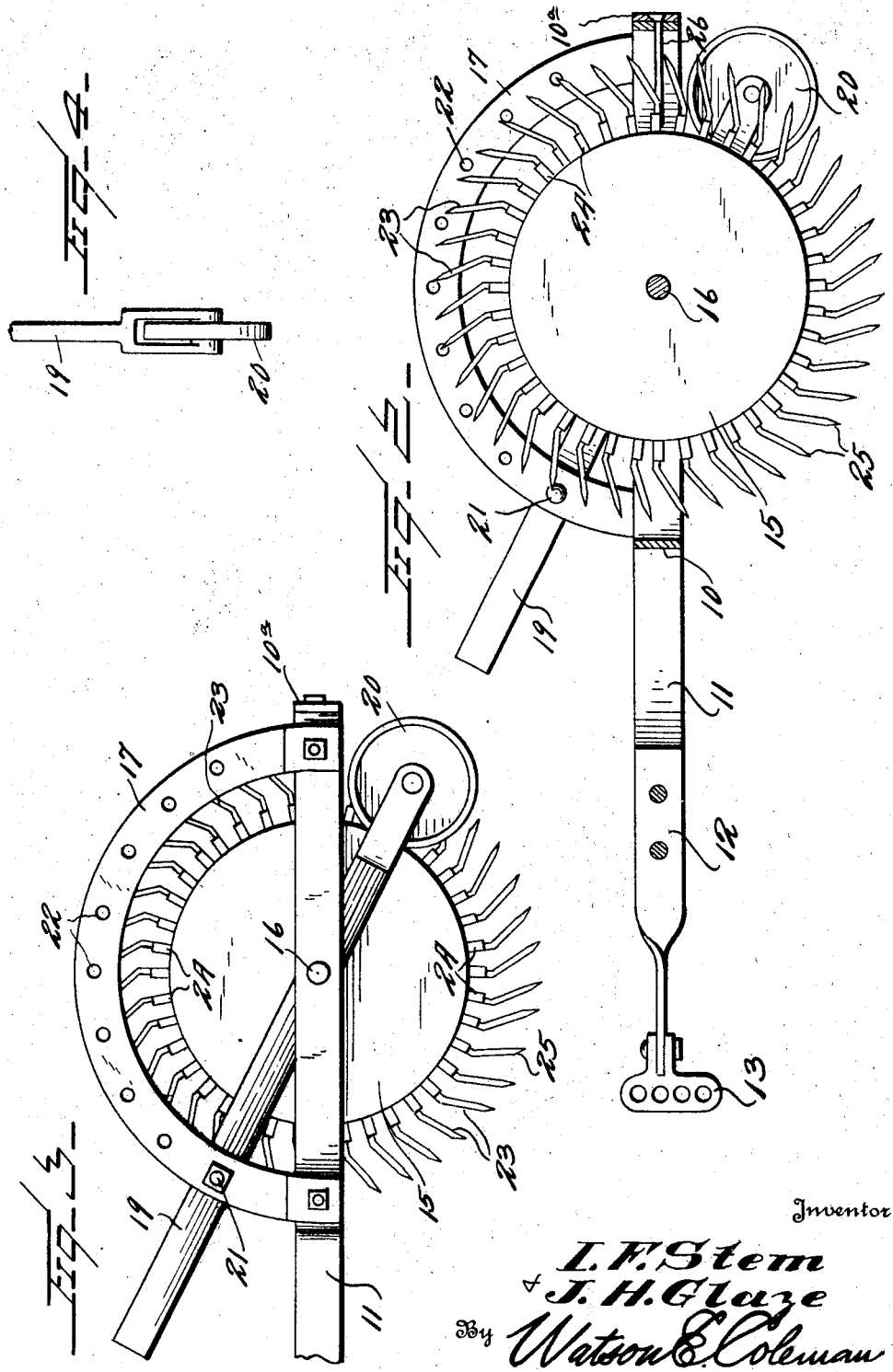

Patented Dec. 25, 1928.

1,696,654

UNITED STATES PATENT OFFICE.

ISAAC F. STEM AND JOHN H. GLAZE, OF MOUNTAIN VIEW, CALIFORNIA.

ROLLER CULTIVATOR.

Application filed February 21, 1927. Serial No. 169,999.

This invention relates to cultivators or harrows and particularly to roller harrows or cultivators.

The general object of the present invention is to provide a roller harrow particularly designed for use in orchards and other like places where cultivation must be deep and where the machine must run close up to the trees.

A further object is to provide a harrow of this nature having heavy rollers formed with outwardly projecting blades and having means whereby the rollers may be lifted from the ground when desired, these rollers being disposed within the limits of the frame and thus being out of the way in cultivating close to trees.

Another object is to provide removable teeth or blades or teeth for the cultivator.

Our invention is illustrated in the accompanying drawings wherein:—

Figure 1 is a top plan view of our cultivator;

Fig. 2 is a longitudinal sectional view thereof;

Fig. 3 is a side elevation thereof;

Fig. 4 is a fragmentary elevation of one of the lifting wheels;

Figures 5, 6 and 7 are perspective views of the various forms of teeth.

Referring to these drawings it will be seen that the frame 10 of the cultivator is approximately rectangular in form and that this frame is disposed within or operatively connected to an outer frame having longitudinal bars 11 riveted, bolted, or otherwise attached to the inner frame, these bars extending towards each other and then extending forward and being provided at 12 with means whereby draft may be applied to the cultivator as, for instance, by means of the clevis 13. Preferably this cultivator is designed to be tractor drawn. The main frame 10 is braced by longitudinally extending braces and in the illustration, one brace 14 is shown for this purpose.

Mounted between the end bars of the main frame and the brace 14 are the two rollers 15 which are made of any suitable material as, for instance, concrete, iron, or the like, and these rollers are mounted upon trunnion bearings 16. Attached to the frame bars 11 and to the ends of the main frame are the arcuate, upwardly bowed segments or racks 17 and pivotally mounted upon the trunnions 16 are the levers 19 each carrying at its lower end a ground engaging roller 20. The levers 19 may have any suitable means for engaging them with the corresponding segments or racks 17 to hold the rollers either in a relatively raised position or in a lowered position. We have illustrated a bolt 21 as passing through apertures 22 in the segments 17 for the purpose of holding the levers 19 in adjusted positions.

The rollers 15 are provided with teeth or blades 23. These blades are engaged with the rollers in any suitable manner and preferably the blades are removable or detachable from the rollers and to this end I have shown the rollers as being formed with outwardly projecting stubs or tenons 24 to which the teeth 23 are bolted. These teeth under certain circumstances and for certain purposes are forwardly curved and chisel-shaped at the ends as at 25. Shovel-shaped teeth may be used, as illustrated in Figure 6, and designated 23ª.

For the purpose of clearing earth from the teeth 23 I provide the rear transverse bar 10ª of the frame 10 with forwardly projecting teeth 26 spaced so as to extend between the teeth 23. The teeth 23 are preferably arranged in lines diagonal to the longitudinal axis of the roller or, in other words, spirally with relation to the roller and the teeth are preferably arranged in circumferential rows. By lowering the wheels 20 the machine may be moved from place to place. Attention is particularly called to the fact that these wheels 20 are directly under the frame and out of the way and are within the limits of the frame so as to permit the machine to be used close up to the trees in an orchard. These wheels 20 may be adjustably shifted so as to raise or lower the machine to a greater or less extent, thus governing the penetration of the teeth or may be adjusted to entirely lift the rollers from the ground. It will be seen that the teeth by reason of their curvature, enter the ground with a forward stroke, one tooth entering as another is leaving, thus eliminating the tendency to bounce and digging up the earth after the manner of a man with a pick. Every tooth thus does the work and the entire ground is dug up deeply the entire width of the machine. The rollers are intentionally heavy rollers so as to force the teeth well down into the ground which is necessary for deep digging.

The sharp spade-like teeth 23ª may be substituted for the pointed or chisel-shaped teeth 23 for the purpose of chopping up heavy cover crops. This is particularly necessary on the Pacific coast where these cover crops are extensively used. It will be understood, of course, that the teeth are designed to be made in several sizes and shapes to suit the class of work to be done. Thus, for instance, a hoe-shaped or sharp edged blade 23^b may be used for cutting up cover crops.

We are aware of the fact that harrows and like cultivating implements have before this been made with rollers and projecting teeth but all of such harrows as far as known to us have been relatively light affairs and intended for merely light harrowing and for top work only. These harrows are not suitable for deep digging. Furthermore the ground engaging rollers whereby the frame of the machine is raised or lowered are not disposed within the limits of the frame but project laterally with relation to the frame so that such implements cannot be used for close work, particularly in orchards. Our machine is particularly simple without complicated parts and rolls easily over the ground so that only a light draft is required. Furthermore the curved form of the teeth tends to dig up the ground properly instead of merely puncturing the ground.

We claim:—

A cultivator comprising an outer, substantially rectangular frame having a draft tongue, an inner rectangular frame disposed within and on the same level as the outer frame and abutting against the rear bar of the outer frame but spaced from the ends of the outer frame, means connecting the inner frame to the outer frame at spaced points, a roller cultivator having trunnions extending through the inner and outer frames at the ends thereof, levers pivotally mounted upon the said trunnions, one at each end of the roller cultivator, and each lever having a roller at its lower end, and arcuate bars attached to the forward and rear ends of the outer and inner frames and extending concentric to the trunnions and having aligning apertures, and bolts adapted to pass through the levers and through said apertures to thereby hold the levers in adjusted positions to raise or lower the machine from the ground, each of said levers being adjustable independently of the other lever.

In testimony whereof we hereunto affix our signatures.

ISAAC F. STEM.
JOHN H. GLAZE.